United States Patent Office 3,380,878
Patented Apr. 30, 1968

3,380,878
THERMOPLASTIC MATRIX
John B. Wheeler III, Middlesex, N.J., assignor to Union Carbide Corporation, a corporation of New York
No Drawing. Filed May 7, 1964, Ser. No. 365,797
18 Claims. (Cl. 161—184)

ABSTRACT OF THE DISCLOSURE

A reformable thermoplastic matrix having thermal and dimensional stability and uniform mold shrinkage against which printing plates can be molded, formed from a sheet of thermoplastic polyarylene polyether.

---

This invention relates to a thermoplastic matrix against which polymeric material can be molded to produce printing plates, sound records, and the like. More particularly this invention relates to a reformable thermoplastic matrix characterized by uniform mold shrinkage in all directions and thermal and dimensional stability at molding temperatures of up to 350° F.

Compositions in sheet form comprising a fibrous base and a thermosetting synthetic resin binder, suitable for forming into matrices, are disclosed in U.S. Patents 2,278,291 to Swann et al. and 2,509,499 to Higgins. However, several problems have become associated with forming matrices from these compositions and molding articles, especially printing plates, from the matrices.

One such problem has been poor reproduction of the pattern or original printing plate against which a matrix is formed, especially the fine screen half-tone dots with screen rulings of 120 lines per inch or more where it is difficult to get sufficient depth in the shadow areas to prevent them from being filled in with ink on the printing press. This is due in general to the non-homogeneous character of the sheet composition and specifically to fiber shear during forming of a matrix. Another problem is dimensional instability due to the presence of moisture in the compositions. Moisture also causes a sheet to non-uniformly shrink in different directions upon forming a matrix, leading to poor reproduction of the original. Furthermore, shrinkage varies from sheet to sheet which makes color registration between plates of a set difficult to obtain. Because the sheets are made up of dissimilar components having different coefficients of thermal expansion, warping of the matrix during use has been yet another problem.

The use of a thermosetting binder for the fibrous base requires long cure cycles which effects the efficiency of the matrix forming operation. Insufficient cure of the thermosetting resin results in picking of the matrix surface which cuts down on the usable life of the matrix. Because the thermosetting binder is cured to the infusible state, the matrix cannot be reused to form other matrices. Furthermore, it has been observed that compositions incorporating a thermosetting binder deteriorate at temperatures of 350° F. to 400° F.

Thermoplastic materials which are fabricated by conventional techniques are generally not available for use as a matrix because they exhibit poor thermal and dimensional stability at elevated temperatures normally encountered in matrix molding. It has been determined that the maximum practical use temperature for a thermoplastic material as a matrix under normal molding conditions is about 40–50° F. below the glass transition temperature of a polymer. In the case of high performance polymers such as polycarbonate resin which has a glass transition temperature of 302° F., this maximum use temperature is about 250° F. At temperatures in excess of 250° F., the tensile modulus and tensile strength of polycarbonate drops off rapidly which renders this resin unsuitable for use as a matrix at molding temperatures in excess of about 250° F.

The present invention overcomes all of the aforementioned problems associated with fibrous based, thermosetting synthetic resin compositions by providing a matrix which permits excellent reproduction of an original, including fine screen half-tone dots. The matrix of the present invention eliminates the problems of dimensional instability, non-uniform shrinkage and warping heretofore met with fibrous based, thermosetting synthetic resin compositions. Furthermore, because the matrix of the present invention does not include a thermosetting synthetic resin binder, problems such as long cure cycles, picking of the matrix surface, and non-reusability are also eliminated. The matrix of the present invention is formed from a sheet of thermoplastic material by any of the fabrication techniques known for thermoplastic materials, yet the matrix so formed does not suffer from problems usually met with thermoplastic materials, namely poor thermal and dimensional stability at elevated temperatures normally encountered in molding with a matrix.

Broadly, the matrix of the present invention, which is formed from a sheet of thermoplastic polyarylene polyether, exhibits uniform mold shrinkage in all directions of 0.5% and less, is characterized by being thermally and dimensionally stable at molding temperatures of up to 350° F., and is reformable as herein described. Thermoplastic polyarylene polyether is described in detail below.

Another embodiment of the present invention is a matrix formed from a composite sheet of fiber-reinforced thermoplastic polyarylene polyether which comprises at least one fibrous layer bound between layers of thermoplastic polyarylene polyether, and the matrix so formed exhibits uniform mold shrinkage in all directions of 0.5% and less, is reformable and is characterized by being thermally and dimensionally stable at temperatures of up to 350° F., with the further proviso that the thickness of the thermoplastic polyarylene polyether at the surfaces of the composite sheet is thicker than the deepest impression made into it during the formation of a matrix.

Mold shrinkage, as indicated above, is a particular problem associated with fibrous based, thermosetting synthetic resin sheet compositions. With this composition, mold shrinkage is non-uniform in different directions for a given matrix and this non-uniformity varies in degree from matrix to matrix. A certain amount of mold shrinkage, that is the decrease in size of a matrix as compared to the original pattern after being formed therefrom, can be tolerated in amounts up to 0.5%, but it is essential and highly desirable that mold shrinkage be uniform from matrix to matrix and for each matrix, uniform in all directions. The matrix of the present invention possesses just this capability. The matrix offers a true reproduction of the original pattern with a tolerable uniform reduction in size which is the same from matrix to matrix. Prior matrices do not even approach this degree of uniformity.

Another specific embodiment of the matrix of the present invention is that it is capable of being reformed. This is accomplished by forming a first matrix by contacting a sheet of thermoplastic polyarylene polyether with a first pattern and applying heat and pressure, and thereafter forming a second matrix by contacting the back of the first matrix with a second pattern and applying heat and pressure. The first matrix is obliterated in the process and forms the smooth back of the second matrix. This process can be repeated several times to form two, three, four or more different or identical matrices from the same sheet of thermoplastic polyarylene polyether.

Thermoplastic polyarylene polyethers in sheet form which are formed into the matrix of the present invention are the linear thermoplastic reaction products of an alkali metal double salt of a dihydric phenol and a dihalobenzenoid compound. The polymer has a basic structure composed of recurring units having the formula

—O—E—O—E'— wherein E is the residuum of the dihydric phenol and E' is the residuum of the benzenoid compound having an inert electron withdrawing group in at least one of the positions ortho and para to the valence bonds, and where both of said residua are valently bonded to the ether oxygens through aromatic carbon atoms.

The residuum E of the dihydric phenol can be, for instance, a mononuclear phenylene group as results from hydroquinone and resorcinol, or it may be a di- or polynuclear residuum. The residuum E can also be substituted with other inert nuclear substituents such as halogen, alkyl, alkoxy and like inert substituents.

It is preferred that the dihydric phenol be a weakly acidic dinuclear phenol such as, for example, the dihydroxy diphenyl alkanes or the nuclear halogenated derivatives thereof, which are commonly known as "bisphenols," such as, for example, the 2,2-bis-(4-hydroxyphenyl) propane, 1,1-bis(4-hydroxyphenyl)-2-phenyl ethane, bis(4-hydroxyphenyl)methane, or the chlorinated derivatives containing one or two chlorines on each aromatic ring. Other suitable dinuclear dihydric phenols are the bisphenols of a symmetrical or unsymmetrical joining group as, for example, either oxygen (—O—), carbonyl

sulfide (—S—), sulfone

or hydrocarbon residue in which the two phenolic nuclei are joined to the same or different carbon atoms of the residue such as, for example, the bisphenol of acetophenone, the bisphenol of benzophenone, the bisphenol of vinyl cyclohexene, the bisphenol of α-pinene, and the like bisphenols where the hydroxyphenyl groups are bound to the same or different carbon atoms of an organic linking group.

Such dinuclear phenols can be characterized as having the structure:

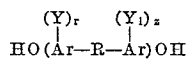

wherein Ar is an aromatic group and preferably is a phenylene group, Y and $Y_1$ can be the same or different inert substituent groups as alkyl groups having from 1 to 4 carbon atoms, halogen atoms, i.e. fluorine, chlorine, bromine, or iodine, or alkoxy radicals having from 1 to 4 carbon atoms, r and z are integers having a value of from 0 to 4, inclusive, and R is representative of a bond between aromatic carbon atoms as in dihydroxydiphenyl, or is a divalent radical, including for example, inorganic radicals as

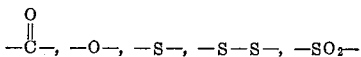

and divalent organic hydrocarbon radicals such as alkylene, alkylidene, cycloaliphatic, or the halogen, alkyl, aryl or like substituted alkylene, alkylidene and cycloaliphatic radicals as well as alkalicyclic, alkarylene and aromatic radicals and a ring fused to both Ar groups.

Examples of specific dihydric polynuclear phenols include among others: the bis-(hydroxyphenyl)alkanes such as 2,2 - bis - (4-hydroxyphenyl)propane, 2,4'-dihydroxydiphenyl)methane, bis-(2-hydroxyphenyl)methane, bis-(4-hydroxyphenyl)methane, bis - (4-hydroxy-2,6-dimethyl-3-methoxyphenyl)methane, 1,1 - bis - (4 - hydroxyphenyl) ethane, 1,2-bis-(4-hydroxyphenyl)ethane, 1,1-bis-(4-hydroxy - 2 - chlorophenyl)ethane, 1,1-bis-(3-methyl-4-hydroxyphenyl)propane, 1,3 - bis-(3-methyl-4-hydroxyphenyl)propane, 2,2 - bis-(3-phenyl-4-hydroxyphenyl)propane, 2,2-bis-(3-isopropyl-4-hydroxyphenyl)propane, 2,2-bis-(2-isopropyl - 4-hydroxyphenyl)propane, 2,2-bis-(4-hydroxynaphthyl)propane, 2,2-bis-(4-hydroxyphenyl)pentane, 3,3-bis-(4-hydroxyphenyl)pentane, 2,2-bis-(4-hydroxyphenyl)heptane, bis - (4-hydroxyphenyl)phenylmethane, 2,2-bis - (4 - hydroxyphenyl)-1-phenylpropane, 2,2-bis-(4-hydroxyphenyl)-1,1,1,3,3,3-hexafluoropropane and the like;

di(hydroxyphenyl)sulfones such as bis - (4-hydroxyphenyl)sulfone, 2,4'-dihydroxydiphenyl sulfone, 5'-chloro-2,4'-dihydroxydiphenyl sulfone, 5'-chloro-4,4'-dihydroxydiphenyl sulfone, and the like;

di(hydroxyphenyl)ethers such as bis-(4-hydroxyphenyl)ether, the 4,3'-, 4,2'-, 2,2'-, 2,3'-dihydroxydiphenyl ethers, 4,4'-dihydroxy-2,6-dimethyldiphenyl ether, bis-(4-hydroxy - 3 - isobutylphenyl)ether, bis-(4-hydroxy-3-isopropylphenyl)ether, bis-(4-hydroxy-3-chlorophenyl)ether, bis - (4-hydroxy-3-fluorophenyl)ether, bis-(4-hydroxy-3-bromophenyl)ether, bis-(4-hydroxynaphthyl)ether, bis-(4 - hydroxy-3-chloronaphthyl)ether, 4,4'-dihydroxy-3,6-dimethoxydiphenyl ether, 4,4'-dihydroxy-2,5-diethoxydiphenyl ether, and like materials.

It is also contemplated to use a mixture of two or more different dihydric phenols to accomplish the same ends as above. Thus when referred to above the E residuum in the polymer structure can actually be the same or different aromatic residua.

As used herein, the E term defined as being the "residuum of the dihydric phenol" refers to the residue of the dihydric phenol after the removal of the two aromatic hydroxyl groups. Thus it is readily seen that polyarylene polyethers contain recurring groups of the residuum of the dihydric phenol and the residuum of the benzenoid compound bonded through aromatic ether oxygen atoms.

The residuum E' of the benzenoid compound can be from any dihalobenzenoid compound or mixture of dihalo benzenoid compounds which compound or compounds have the two halogens bonded to benzene rings having an electron withdrawing group in at least one of the positions ortho and para to the halogen group. The dihalobenzenoid compound can be either mononuclear where the halogens are attached to the same benzenoid ring or polynuclear where they are attached to different benzenoid rings, as long as there is the activating electron withdrawing group in the ortho or para position of that benzenoid nucleus.

Any of the halogens may be the reactive halogen substituents on the benzenoid compounds, fluorine and chlorine substituted benzenoid reactants being preferred.

Any electron withdrawing group can be employed as the activator group in the dihalobenzenoid compounds. Preferred are the strong activating groups such as the sulfone group

bonding two halogen substituted benzenoid nuclei as in the 4,4'-dichlorodiphenyl sulfone and 4,4'-difluorodiphenyl sulfone, although such other strong withdrawing groups hereinafter mentioned can also be used with ease. It is further preferred that the ring contain no electron supplying groups on the same benzenoid nucleus as the halogen; however, the presence of other groups on the nucleus or in the residuum of the compound can be tolerated. Preferably, all of the substituents on the benzenoid nucleus are either hydrogen (zero electron withdrawing), or other groups having a positive sigma* value, as set forth in J. F. Bunnett in Chem. Rev., 49, 273 (1951), and Quart. Rev., 12, 1 (1958).

The electron withdrawing group of the dihalobenzenoid compound can function either through the resonance of the aromatic ring, as indicated by those groups having a high sigma* value, i.e. above about +0.7 or by induction as in perfluoro compounds and like electron sinks.

Preferably the activating group should have a high sigma* value, preferably above 1.0, although sufficient activity is evidenced in those groups having a sigma* value above 0.7.

The activating group can be basically either of two types;

(a) Monovalent groups that activate one or more halogens on the same ring as a nitro group, phenylsulfone, or alkylsulfone, cyano, trifluoromethyl, nitriso, and hetero nitrogen as in pyridine.

(b) Divalent group which can activate displacement of halogens on two different rings, such as the sulfone group

the carbonyl group

the vinyl group

the sulfoxide group

the azo-group —N=N—; the saturated fluorocarbon groups —$CF_2CF_2$—; organic phosphine oxides

where R is a hydrocarbon group, and the ethylidene group

where X can be hydrogen or halogen or which can activate halogens on the same ring such as with difluorobenzoquinone, 1,4- or 1,5- or 1,8-difluoroanthraquinone.

If desired, the polymers may be made with mixtures of two or more dihalobenzenoid compounds each of which has this structure, and which may have different electron withdrawing groups. Thus the E' residuum of the benzenoid compounds in the polymer structure may be the same or different.

It is seen also that as used herein, the E' term defined as being the "residuum of the benzenoid compound" refers to the aromatic or benzenoid residue of the compound after the removal of the halogen atoms on the benzenoid nucleus.

From the foregoing, it is evident that preferred linear thermoplastic polyarylene polyethers are those wherein E is the residuum of a dinuclear dihydric phenol and E' is the residuum of a dinuclear benzenoid compound. These preferred polymers then are composed of recurring units having the formula

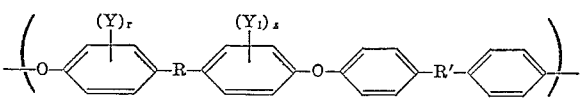

wherein R represents a member of the group consisting of a bond between aromatic carbon atoms and a divalent connecting radical and R' represents a member of the group consisting of sulfone, carbonyl, vinyl, sulfoxide, azo, saturated fluorocarbon, organic phosphine oxide and ethylidene groups and Y and $Y_1$ each represent inert substituent groups selected from the group consisting of halogen, alkyl groups having from 1 to 4 carbon atoms and alkoxy groups having from 1 to 4 carbon atoms and where r and z are integers having a value from 0 to 4 inclusive. Even more preferred are the thermoplastic poly-arylene polyethers of the above formula wherein r and z are zero, R is divalent connecting radical

wherein R" represents a member of the group consisting of hydrogen, lower alkyl, lower aryl, and the halogen substituted groups thereof, and R' is a sulfone group.

Thermoplastic polyarylene polyethers described herein can be prepared in a substantially equimolar one-step reaction of a double alkali metal salt of a dihydric phenol with a dihalobenzenoid compound in the presence of specific liquid organic sulfoxide or sulfone solvents under substantially anhydrous conditions. Any alkali metal salt of the dihydric phenol can be used as the one reactant.

The specific solvents employed have the formula

wherein each R represents a monovalent lower hydrocarbon group free of aliphatic unsaturation on the alpha carbon atom, and preferably contains less than about 8 carbon atoms or when connected together represents a divalent alkylene group with z being an integer from 1 to 2 inclusive. In all of these solvents, all oxygens and two carbon atoms are bonded directly to the sulfur atom. Specifically mentionable of these solvents are dimethylsulfoxide, dimethylsulfone, diethylsulfoxide, diethylsulfone, diisopropylsulfone, tetrahydrothiophene 1,1-dioxide (commonly called tetramethylene sulfone or sulfolane), tetrahydrothiophene-1 monoxide, and the like.

Thermoplastic polyarylene polyethers described herein can also be prepared in a two-step process in which a dihydric phenol is first converted in situ in a primary reaction solvent to the alkali metal salt by the reaction with the alkali metal, the alkali metal hydride, alkali metal hydroxide, alkali metal alkoxide or the alkali metal alkyl compounds.

In the polymerization reactions described herein substantially anhydrous conditions are maintained before and during the reaction. While amounts of water up to about one percent can be tolerated amounts of water substantially greater than this are desirably avoided. In order to secure high molecular weight polymers, the system should be substantially anhydrous, and preferably with less than 0.5 percent by weight water in the reaction mixtures.

In the two-step process described above, where the alkali metal salt of the dihydric phenol is prepared in situ in the reaction solvent, the dihydric phenol and an alkali metal hydroxide are admixed in essentially stoichiometric amounts and normal precautions taken to remove all the water of neutralization preferably by distillation of a water-containing azeotrope from the solvent-metal salt mixture. Benzene, xylene, halogenated benzenes or other inert organic azeotrope-forming organic liquids are suitable for this purpose.

The azeotrope former can be one either miscible or immiscible with the sulfone or sulfoxide major solvent. If it is not miscible it should be one which will not cause precipitation of the polymer in the reaction mass. Heptane is such a solvent. It is preferred to employ azeotrope formers which are miscible with the major solvents and which also act as cosolvents for polymer during polymerization. Chlorobenzene, dichlorobenzene and xylene are azeotrope formers of this class. Preferably the azeotrope former should be one boiling below the decomposition temperature of the major solvent and be perfectly stable and inert in the process, particularly inert to the alkali metal hydroxide when the alkali metal salt of the dihydric phenol is prepared in situ in the presence of the inert diluent or azeotrope former. It has been found that chlorobenzene and o-dichlorobenzene serve particularly well as the inert diluent and are able to significantly reduce the amount of the sulfone or sulfoxide solvent necessary.

The cosolvent mixture using even as much as 50 percent of the halogenated benzene with dimethylsulfoxide, for example, not only permits the formed polymer to remain in solution and thus produce high molecular weight polymers, but also provides a very economical processing system, and an effective dehydration operation.

The reaction between the dihalobenzenoid compound and the alkali metal salt of the bisphenol proceeds on an equimolar basis. This can be slightly varied but as little a variation of 5 percent away from equal molar amounts seriously reduces the molecular weight of the polymers.

The reaction of the dihalobenzenoid compound with the alkali metal salt of the dihydric phenol readily proceeds without need of an added catalyst upon the application of heat to such a mixture in the selected sulfone or sulfoxide solvent.

Also desirable is the exclusion of oxygen from the reaction mass to avoid any possibility of oxidative attack to the polymer or to the principal solvent during polymerization.

Reaction temperatures above room temperature and generally above 100° C., are preferred. More preferred are temperatures between about 120° C. to 160° C. Higher temperatures can of course be employed, if desired, provided that care is taken to prevent degradation or decomposition of the reactants, the polymer and the solvents employed. Also temperatures higher than 100° C. are preferred in order to keep the polymer in solution during the reaction since these sulfoxide and sulfone solvents are not particularly good solvents for the polymer except in the hot condition.

The polymer is recovered from the reaction mass in any convenient manner, such as by precipitation induced by cooling the reaction mass or by adding a nonsolvent for the polymer, or the solid polymer can be recovered by stripping off the solvent at reduced pressures or elevated temperatures.

Since the polymerization reaction results in the formation of the alkali metal halide on each coupling reaction, it is preferred to either filter the salts from the polymer solution or to wash the polymer to substantailly free it from these salts.

Thermoplastic polyarylene polyethers as described herein are characterized by high molecular weights indicated by reduced viscosity in indicated solvents. For purposes of the present invention, it is preferred that thermoplastic polyarylene polyethers have a reduced viscosity above about 0.35 and most preferably above about 0.4. The manner of determining reduced viscosity is detailed infra.

Sheets of thermoplastic polyarylene polyether suitable for forming into the matrix of the present invention can be fabricated by any known thermoplastic forming technique such as extruding, compression molding, injection molding, solution casting and the like. The thickness of sheets employed is not critical but is rather governed by practical considerations such as cost and ease of forming. In general, the most useful range of thickness for thermoplastic polyarylene polyether sheets is from about 0.030 inch to about 0.250 inch while the range of from about 0.080 inch to about 0.125 inch is preferred.

As indicated above, the matrix of the present invention can be formed from a composite sheet of fiber-reinforced thermoplastic polyarylene polyether with the proviso that the thickness of the thermoplastic polyarylene polyether at the surfaces of the composite sheet is thicker than the deepest impression made into it during the formation of a matrix. To this end, any fiber reinforcing material can be used. Examples of such reinforcement are woven and unwoven fibrous cloth, fibrous mats and bats, continuous fibrous filaments and strands, and the like. Fiberglass, especially in the form of a thin mat or woven cloth, has been found to perform well. The use of fiber reinforcement adds strength to a matrix thereby extending its useful life and reduces uniform mold shrinkage down to levels as low as 0.1%.

One or more layers of the same or different fiber reinforcement can be utilized if desired. It is also desirable that the fiber reinforcement used be sufficiently porous or open to allow for complete impregnation thereof by thermoplastic polyarylene polyether during formation of the sheet and matrix.

As stated above, the thickness of the thermoplastic polyarylene polyether at the surfaces of the composite sheet is thicker than the deepest impression made into it during the formation of a matrix. This arrangement permits for excellent reproduction of an original in a homogeneous portion of the composite sheet and eliminates the problem of poor reproduction due to fiber shear. Stated in different terms, the material at the surfaces of a composite sheet is free from interfering fiber reinforcement.

A composite sheet whereby a layer or layers of fiber reinforcement is bound between layers of thermoplastic can conveniently be prepared by interposing a layer of fiber reinforcement between two sheets of thermoplastic polyarylene polyether and applying heat and pressure to compact the layers into a single composite fiber reinforced sheet. A composite sheet having two or more layers of fiber reinforcement can be prepared in a similar manner by interposing a film or thin sheet of thermoplastic polyarylene polyether between fiber layers, thereafter interposing the sandwich construction so formed between two layers of thermoplastic polyarylene polyether and applying heat and pressure to compact the layers into a single composite fiber reinforced sheet. Other methods can be used such as extruding and joining two sheets of thermoplastic polyarylene polyether while interposing a layer of fiber reinforcement prior to joining the sheets. Other methods of preparing a composite sheet which insures that the thickness of the thermoplastic polyarylene polyether at the surfaces of the composite sheet will be thicker than the deepest impression made into it during the formation of a matrix can be used as will be evident to those skilled in the art. Usable thickness ranges for the composite sheet are the same as those given for a sheet of polyarylene polyether.

The matrix of the present invention is generally formed by contacting a sheet or composite sheet of thermoplastic polyarylene polyether described herein with an original plate or pattern, applying heat and pressure, separating the matrix and original and allowing the matrix to cool. In this maner, excellent reproduction of the original is obtained in the matrix against which true duplicates of the original can be molded as described infra.

The temperature at which a matrix can be formed is not narrowly critical. Obviously, the lowest temperature will be the temperature at which the polymer can be formed under pressure, and the highest temperature will be below the decomposition temperature of the polymer or softening point of the original. Temperatures ranging from 415° F. to 550° F., preferably 425° F. to 475° F. meet these practical criteria for the thermoplastic polyarylene polyether. Matrices can be formed from unmounted copper originals at temperatures of 415° F. to 550° F., from zinc and magnesium originals at temperatures of 425° F. to 475° F. and from type metal, such a Linotype metal which softens under pressure at about 440° F., at temperatures of 425° F. to 435° F.

Molding pressure can vary widely. Useful pressures range from 200 p.s.i. to 1000 p.s.i., preferably from 250 p.s.i., to 500 p.s.i.

Specific examples of suitable techniques for forming a matrix of the present invention are detailed in Examples 2 and 4 below.

As indicated previously, the matrix of the present invention is characterized by uniform mold shrinkage in all directions and by thermal and dimensional stability at molding temperatures of up to 350° F. In general, it has been found that sheets of thermoplastic polyarylene polyethers described herein will shrink when formed into a matrix in an amount of from about 0.1% to about 0.5%. This range is within the commercially established limit of 0.5% shrinkage for matrices used for to form duplicate printing plate members. It is to be noted that a unique feature of the matrix of the present invention is that the degree of shrinkage for each matrix formed from sheets of thermoplastic polyarylene polyether having like properties, e.g. the same reduced viscosity, will be the same, that is, uniform from sheet to sheet, and uniform in all directions within each sheet. This feature enables a matrix fabricator to rely on a uniform recurring degree of shrinkage for a given polymer formulation, and hence obtain overall constantly superior results.

For purposes of illustrating the thermal and dimensional stability of the matrix of the present invention, Tables I and II below list comparative physical properties for matrices formed from thermoplastic polyarylene polyether having the structure

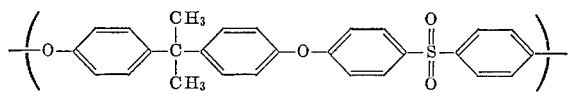

polyhydroxyether, which is a bisphenol A polyhydroxyether of the structure

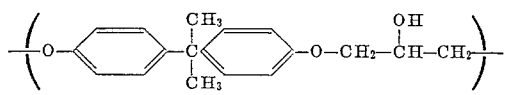

and polycarbonate which is a bisphenol A polycarbonate of the formula

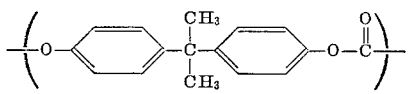

TABLE I

|  | Polyarylene Polyether | Matrix Formed From | |
|---|---|---|---|
|  |  | Polyhydroxyether | Polycarbonate |
| Tensile Modulus, p.s.i. | 350,000 | 280,000 | 340,000 |
| Tensile Strength, p.s.i. | 10,500 | 8,000 | 10,000 |
| Glass Transition Temp., °F. (Tg) | 392 | 212 | 302 |
| Heat Distortion, °F., at 264 p.s.i. | 350 | 185 | 270 |

TABLE II

| Temp. °F. | Tensile Modulus, p.s.i. for Matrix Formed from— | | Tensile Strength, p.s.i. for Matrix Formed from— | |
|---|---|---|---|---|
|  | Polyarylene polyether | Polycarbonate | Polyarylene polyether | Polycarbonate |
| 212 | 220,000 | 170,000 | 6,500 | 5,000 |
| 257 | 190,000 | 160,000 | 5,900 | 5,000 |
| 302 | 170,000 | 20,000 | 4,000 | 1,500 |
| 350 | 165,000 | Softened | 3,000 | Softened |
| 392 | 1,200 |  | 100 |  |

Tables I and II demonstrate that the matrix of the present invention can be used to mold duplicate polymeric members at temperatures of up to about 350° F. whereas, polyhydroxyether and polycarbonate can only be used at temperatures of up to about 160° F. and 250° F. respectively. However, most molding with a matrix is conducted at temperatures in excess of about 250° F. which renders polyhydroxyether and polycarbonate unsuitable for general matrix use. Polycarbonate is further limited by its drop off in tensile modulus from 160,000 p.s.i. at 257° F. to zero to 347° F., whereas thermoplastic polyarylene polyether retains its tensile modulus at 350° F. as is shown in Table II. The matrix of the present invention provides the versatility of thermoplastic materials yet is capable of withstanding the rigors of molding with a matrix without the problems currently met with thermosetting resin formulations and contrary to what has generally been thought of with respect of the high temperature capabilities of thermoplastic materials.

Polymeric material which can be molded against the matrix of the present invention to produce printing plates and the like can be either a thermoplastic, thermosetting, natural or synthetic polymeric material. In general, any normally solid polymeric material which is capable of being compression molded or cured by the application of pressure and heat up to about 350° F. can be molded against the matrix of the present invention.

Suitable thermoplastic materials include natural and synthetic rubbers, polyolefins such as polyethylene and polypropylene, polyvinylidene chloride, polyvinyls, polystyrene, polyethers, polyacrylates, polymethacrylates, polyamides, polycarbonates, polyhydroxyethers, polyoxymethylenes, copolymers and mixtures thereof, and the like.

Suitable thermosetting resins include phenol-aldehyde polymers, urea-aldehyde polymers, melamine-aldehyde polymers, epoxy resins, polyesters, copolymers and mixtures thereof, and the like.

Polymeric materials moldable against the matrix of the present invention can contain any well known additive such as fillers, dyes, pigments, cross-linking agents, curing agents, stabilizers, plasticizers, preservatives, lubricants, antioxidants, and the like. However, polymeric molding formulations should not contain solvents or other materials which attack the thermoplastic polyarylene polyether matrix. Aromatic and chlorinated solvents fall into this class and their use should be avoided. In general, any component which is inert with respect to the matrix and the polymer molded against the matrix can be included in a molding formulation.

In general, the matrix of the present invention separates readily from an original or duplicate member without the aid of a mold release agent. However, if desired, mold release agents can be used to effect separation between the matrix and original or duplicate member. The use of release agents has been found to be desirable when molding duplicate members from crosslinked polymeric materials such as epoxy resins and rubbers. Suitable mold release agents are graphite, molybdenum disulfide, silicone oils, and the like. The use of solvents or agents which attack the matrix material should be avoided.

Specific examples of suitable techniques for molding duplicate members from the matrix of the present invention are given in the examples below.

The following ASTM procedures were followed in obtaining physical data reported herein.

|  | ASTM |
|---|---|
| Tensile modulus | D638–60T |
| Tensile strength | D638–60T |
| Heat distortion temperature | D–1637–59T |

Reduced viscosity (RV) was determined by dissolving a 0.2 gram sample of thermoplastic polyarylene polyether in chloroform contained in a 100 ml. volumetric flask so that the resultant solution measured exactly 100 ml. at 25° C. in a constant temperature bath. The viscosity of 3 ml. of the solution which had been filtered through a sintered glass funnel was determined in an Ostwald or similar type viscometer at 25° C. Reduced viscosity values were obtained from the equation:

$$\text{Reduced viscosity} = \frac{t_s - t_o}{c \cdot t_o}$$

wherein:

$t_o$ is the efflux time of the pure solvent
$t_s$ is the efflux time of the polymer solution
$c$ is the concentration of the polymer solution expressed in terms of grams of polymer per 100 ml. of solution.

Glass transition temperature ($T_g$), commonly referred to as second order phase transition temperatures, refers to the inflection temperatures found by plotting the resilience (recovery from 1 percent elongation) of a film ranging in thickness from 3–15 mils against the temperature. A detailed explanation for determining resilience and inflection temperature is to be found in an article by Alexander Brown, Textile Research Journal, volume 25, 1955, at page 891.

Mold shrinkage relates the change in dimensions of three selected pairs of marks scribed on a metal original pattern to the dimensions of these same pairs of marks as they are molded into a matrix. This change in dimension is then expressed as a percentage of the dimension of pairs of marks scribed on an original. Mold shrinkage as reported herein was calculated using two pairs of marks parallel to each other and at opposite edges of an original and a third pair of marks on the edge of the original at right angles to the other two pairs. Measurements were made using a micrometer caliper, reading in thousandths of an inch, which was registered on the marks under a 10 power magnifying glass first on the original and then on the matrix formed therefrom. A maximum variance of ±0.1% is encountered in this method of measuring mold shrinkage.

The following examples are illustrative of the present invention and are not intended to limit the same in any manner. All parts and percentages are by weight unless indicated otherwise.

Example 1.—Preparation of thermoplastic polyarylene polyether

In a 250 ml. flask equipped with a stirrer, thermometer, a water cooled condenser and a Dean Stark moisture trap filled with benzene, there were placed 11.42 grams of 2,2-bis-(4-hydroxyphenyl)propane (0.05 mole), 13.1 grams of a 42.8% potassium hydroxide solution (0.1 mole KOH), 50 ml. of dimethylsulfoxide and 6 ml. benzene and the system purged with nitrogen to maintain an inert atmosphere over the reaction mixture. The mixture was refluxed for 3 to 4 hours, continuously removing the water contained in the reaction mixture as an azeotrope with benzene and distilling off enough of the latter to give a refluxing mixture at 130–135° C., consisting of the dipotassium salt of the 2,2-bis-(4-hydroxyphenyl)propane and dimethylsulfoxide essentially free of water. The mixture was cooled and 14.35 grams (0.05 mole) of 4,4'-dichlorodiphenylsulfone was added followed by 40 ml. of anhydrous dimethylsulfoxide, all under nitrogen pressure. The mixture was heated to 130° and held at 130–140° with good stirring for 4–5 hours. The viscous, orange solution was poured into 300 ml. water, rapidly circulating in a Waring Blender, and the finely divided white polymer was filtered and then dried in a vacuum oven at 110° for 16 hours. The yield was 22.2 g. (100%) and the reaction was 99% complete based on a titration for residual base.

The polymer had the basic structure

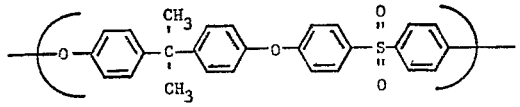

Example 2.—Forming a matrix and molding against the same

Thermoplastic polyarylene polyether pellets having a reduced viscosity of 0.47 prepared as in Example 1 were vacuum stripped for 72 hours at 120° C. The pellets were then compression molded at 500° F. in an electrically heated hydraulic press into four plaques measuring 8″ x 8″ x ⅛″. The first plaque was then contacted with a copper original relief printing plate coated with a silicone mold release oil and placed in an electrically heated hydraulic press having a four inch ram. The plaque and original were preheated at 470° F. for one and one-half minutes at zero pressure with the press platens closed. The thermoplastic matrix was then formed by applying 500 p.s.i. for one minute. The temperature was reduced to 200° F. and the original and matrix removed and cooled to room temperature. The resultant matrix was flat and had perfect reproduction of detail including small dots in the 150 lines per inch screens. Each of the three remaining plaques were formed into a matrix in the same manner as described with the same results. Each matrix formed was measured and was found to have uniformly shrunk in all directions 0.5% from the copper original.

An intimate mixture of polyhydroxyether of the structure

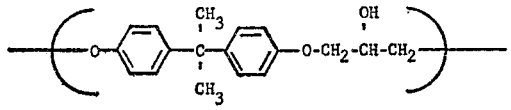

and 5% by weight of rubber comprised of 95% butadiene and 5% styrene was molded against the matrices formed using the press described above. In each instance, the matrix and polymer mixture in contact therewith were preheated at 300° F. for three minutes under zero pressure with the press platens closed. Duplicate printing plates were then molded at 935 p.s.i. for 30 seconds. In each instance an excellent duplicate plate was obtained without any thermal or dimensional degradation of the matrix. The first matrix formed was used to mold seven duplicate plates as described previously. All of the duplicate plates obtained were equally excellent, there being no difference in quality of reproduction between the first and the last plate. The matrix showed no thermal or dimensional degradation after molding of the seven plates.

A 0.08 inch thick sheet of rigid polyvinyl chloride was molded against the second matrix described above. The matrix and sheet in contact therewith were preheated at 285° F. for two minutes under zero pressure with the press platens closed. A duplicate plate was then molded at 500 p.s.i. for one minute. Reproduction was excellent and the matrix showed no thermal or dimensional degradation.

Example 3

Extruded thermoplastic polyarylene polyether sheet 0.09 inch thick, prepared as in Example 1 having a reduced viscosity of 0.59, was cut into 8″ x 8″ plaques. Matrices were then formed from a copper original as described in Example 2. Shrinkage for each matrix was 0.5% and was uniform in all directions.

Polybutadiene-acrylonitrile (Buna N) rubber, polybutadiene-styrene (GRS) rubber, polyisobutylene ("Butyl") rubber, polychloroprene (neoprene) rubber and natural rubber commercial flexible printing plate compositions were molded against the matrices into duplicate printing plates of excellent quality. The plates were molded as in Example 2 using a one and one-half minute preheat at 300° F. and zero pressure, and then 500 p.s.i. at 300° F. for 10 minutes to cure the plates. Mold stops were employed to produce 0.065 inch thick plates. The formulations did not crack or craze the matrices which were otherwise unchanged.

Example 4

Extruded thermoplastic polyarylene polyether sheet 0.09 inch thick, prepared as in Example 1 having a reduced viscosity of 0.49 was cut into 8″ x 8″ plaques. A matrix was formed from a Linotype metal original printing type having a melting point of 475° F. The original, locked in a chase, was contacted with a plaque and placed in a hydraulic press described in Example 2. The original and plaque were preheated for five minutes at zero pressure with the press platens closed. Pressure was then applied slowly for 30 seconds, stopping at 225 p.s.i. for another 30 seconds. The original and matrix were removed from the press. The matrix hardened instantly and was immediately separated from the original without the need of further cooling. Shrinkage was 0.5% and uniform in all directions. The typeface of the original was very sharply molded including the spaces or counters on the inside of the closed letters such as d and e, but the polymer was not forced all the way down to the spacing material between the lines, thus preventing the matrix from becoming locked on the type.

A polyhydroxyether-rubber formulation was molded against this matrix as described in Example 2. An excellent duplicate plate was obtained without any thermal or dimensional degradation of the matrix.

Example 5.—Forming several matrices from a single sheet

A matrix was formed as described in Example 2. The matrix was successfully used to mold a duplicate member as described in Example 2. The back of this matrix was then contacted with a copper original relief printing plate and a second matrix was formed in the same manner as the first. The first matrix was completely obliterated and the second matrix formed shrunk 0.5% uniformly in all directions compared to the copper original. Reproduction of detail was perfect. A duplicate plate was successfully molded as in Example 2. A third matrix was formed by contacting the back of the second matrix with a copper original and forming carried out in the same manner as the first and second matrix. The second matrix was completely obliterated and the third matrix formed shrunk 0.5% uniformly in all directions compared to the copper original. Reproduction of detail was again perfect. A duplicate plate was successfully molded as in Example 2.

This example demonstrates a unique capability of the matrix of the present invention. The advantages of this are obvious. It enables a printer or fabricator to reuse the same sheet several successive times thereby greatly reducing costs and inventory.

Example 6

Thermoplastic polyarylene polyether having the formula

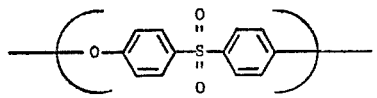

was prepared from 4,4'-dihydroxydiphenyl sulfone and 4,4'-dichlorodiphenyl sulfone according to the procedure in Example 1. This polymer was then formed into a matrix from a copper original as in Example 2. Preheating was conducted at 525° F. for three minutes and molding at the same temperature for 30 seconds under 400 p.s.i. Reproduction of the original was excellent and shrinkage was 0.5% and uniform in all directions.

A butadiene-styrene rubber duplicate plate was molded against the matrix as in Example 2. Preheating was conducted at zero pressure and 300° F. for one and one-half minutes and cured for 10 minutes at the same temperature under 900 p.s.i., using mold stops to produce a plate 0.065" thick. Reproduction was excellent and the matrix showed no thermal or dimensional degradation.

A duplicate plate was also molded from the polyhydroxyether-rubber formulation as in Example 2. Again reproduction was excellent and the matrix showed no thermal or dimensional degradation.

Example 7

Thermoplastic polyarylene polyether having the formula

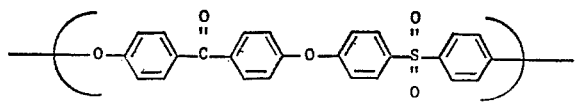

was prepared from the bisphenol of benzophenone and 4,4'-dichlorodiphenylsulfone according to the procedure in Example 1. This polymer was then formed into a matrix from a Linotype original as in Example 2. Preheating was conducted at 410° F. for three minutes and molding at the same temperature for 30 seconds under 225 p.s.i. Results were the same as in Example 4.

A butadiene-styrene rubber duplicate plate was molded against the matrix as in Example 2 and under the conditions in Example 6. Reproduction was excellent and the matrix showed no thermal or dimensional degradation.

A duplicate plate was also molded from the polyhydroxyether-rubber formulation as in Example 2. Again reproduction was excellent and the matrix showed no thermal or dimensional degradation.

Example 8

Thermoplastic polyarylene polyether having the formula

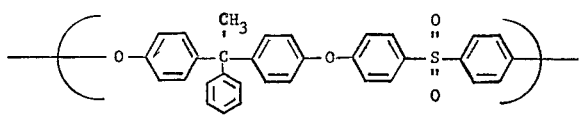

was prepared from the bisphenol of acetophenone and 4,4'-dichlorodiphenylsulfone according to the procedure in Example 1. This polymer was then formed into a matrix from a copper original as in Example 2. Preheating was conducted at 510° F. for three minutes and molding at the same temperature for three minutes under 900 p.s.i. Reproduction was excellent and shrinkage 0.5%, uniform in all directions.

A butadiene-styrene rubber duplicate plate was molded against the matrix as in Example 2 and under the conditions in Example 6. Reproduction was excellent and the matrix showed no thermal or dimensional degradation.

A duplicate plate was also molded from the polyhydroxyether-rubber formulation as in Example 2. Again reproduction was excellent and the matrix showed no thermal or dimensional degradation.

Example 9

Thermoplastic polyarylene polyether having the formula

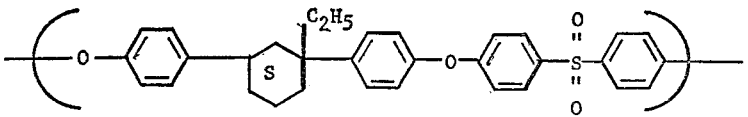

was prepared from the bisphenol of vinyl cyclohexene (prepared by an acid catalyzed condensation of 2 moles of phenol with one mole of vinyl cyclohexene) and 4,4'-dichlorodiphenylsulfone according to the procedure in Example 1. This polymer was then formed into a matrix from a copper original as in Example 2. Preheating was conducted at 475° F. for three minutes and molding at the same temperature for 30 seconds under 400 p.s.i. Reproduction was excellent and shrinkage 0.5%, uniform in all directions.

A butadiene-styrene rubber duplicate plate was molded against the matrix as in Example 2 and under the conditions in Example 6. Reproduction was excellent and the matrix showed no thermal or dimensional degradation.

A duplicate plate was also molded from the polyhydroxyether-rubber formulation as in Example 2. Again reproduction was excellent and the matrix showed no thermal or dimensional degradation.

Example 10

Thermoplastic polyarylene polyether having the formula

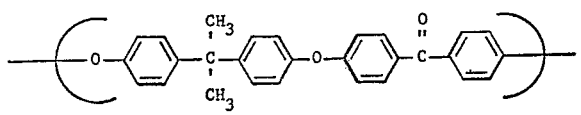

is prepared from 2,2'-bis-(4-hydroxyphenyl)propane and 4,4'-difluorobenzophenone according to the procedure in Example 1. This polymer is formed into a matrix from a copper original as in Example 2.

A duplicate plate is molded against the matrix from the polyhydroxyether-rubber formulation as in Example 2. Reproduction is excellent and the matrix shows no thermal or dimensional degradation.

MAKING FIBER REINFORCED MATRIX

Example 11

Thermoplastic polyarylene polyether from Example 1 having a reduced viscosity of 0.49 was extruded into sheet 0.075 inch thick. Two plaques measuring 8" x 8" were cut from the sheet. The two plaques were placed on top of one another with a 0.090 inch layer of fiberglass cloth interposed between them. The sandwich-like construction was placed in an electrically heated hydraulic press and preheated at 572° F. for 5 minutes at zero pressure with the press platens closed. A pressure of 500 p.s.i. was then applied for 2 minutes to compact the layers into a composite sheet comprising a layer of fiberglass cloth bound between two layers of thermoplastic polyarylene polyether. The composite sheet was removed from the press and allowed to cool. The composite sheet had a thickness of 0.150 inch and the material underlying the surfaces was composed entirely of thermoplastic polyarylene polyether.

The composite sheet was formed against a copper original to form a matrix as in Example 2. Reproduction was excellent and shrinkage 0.4%, uniform in all directions. A duplicate plate was successfully molded against the matrix as described in Example 2. Reproduction was excellent and the matrix showed no thermal or dimensional degradation.

Example 12

Four layers of thermoplastic polyarylene polyether film 0.01 inch thick having a reduced viscosity of 0.49 were alternated with three layers of non-woven fiberglass swirl mat 0.094 inch thick. The alternating layers were then interposed between two layers of woven fiberglass mat 0.031 inch thick, and the resultant sandwich-like construction was then interposed between two 8" x 8" x 0.03" plaques of thermoplastic polyarylene polyether having a reduced viscosity of 0.49. This construction was then compacted into a composite sheet as disclosed in Example 11. The resultant composite sheet was 0.125 inch thick and was composed of five layers of fiberglass mat reinforcement bound between layers of thermoplastic polyarylene polyether.

The composite sheet was formed against a copper original to form a matrix as in Example 2. Reproduction was excellent and shrinkage was less than 0.1%, uniform in all directions. A duplicate plate was successfully molded against the matrix as described in Example 2. Reproduction was excellent and the matrix showed no thermal or dimensional degradation.

Example 13

Example 11 was repeated using instead one layer of non-woven fiberglass mat swirl 0.094 inch thick reinforcement and 0.082 inch thick plaques of thermoplastic polyarylene polyether. The composite sheet was 0.164 inch thick and a matrix molded therefrom shrunk 0.2% uniformly in all directions. A duplicate plate was successfully molded against the matrix. Results were the same as in Example 11.

What I claim is:

1. A reformable, thermoplastic matrix against which polymeric material can be molded to produce printing plates and the like formed from a sheet of thermoplastic polyarylene polyether, said matrix exhibiting uniform mold shrinkage in all directions of 0.5% and less, and characterized by being thermally and dimensionally stable at molding temperatures of up to 350° F.

2. The matrix defined in claim 1 wherein said polyarylene polyether is composed of recurring units having the formula:

wherein E is the residuum of a dihydric phenol and E' is the residuum of a benzenoid compound having an inert electron withdrawing group having a sigma* value above about +0.7 in at least one of the positions ortho and para to the valence bonds, and where both of said residua are valently bonded to the ether oxygens through aromatic carbon atoms.

3. The matrix defined in claim 1 wherein said polyarylene polyether is composed of recurring units having the formula

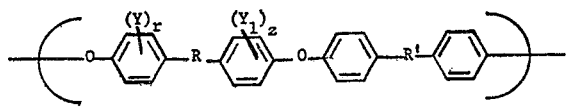

wherein R represents a member of the group consisting of a bond between aromatic carbon atoms and a divalent connecting radical and R' represents a member of the group having a sigma* value above about +0.7 consisting of sulfone, carbonyl, vinyl, sulfoxide, azo, saturated fluorocarbon, organic phosphine oxide and ethylidene groups and Y and $Y_1$ each represent inert substituent groups selected from the group consisting of halogen, alkyl groups having from 1 to 4 carbon atoms and alkoxy groups having from 1 to 4 carbon atoms and where r and z are integers having a value from 0 to 4 inclusive.

4. The matrix defined in claim 1 wherein said polyarylene polyether is composed of recurring units having the formula

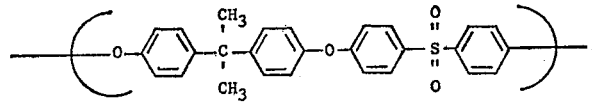

5. The matrix defined in claim 1 wherein said polyarylene polyether is composed of recurring units having the formula

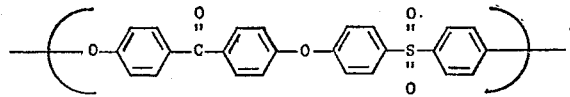

6. The matrix defined in claim 1 wherein said polyarylene polyether is composed of recurring units having the formula

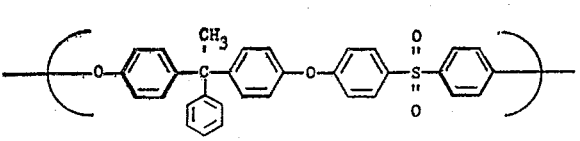

7. The matrix defined in claim 1 wherein said polyarylene polyether is composed of recurring units having the formula

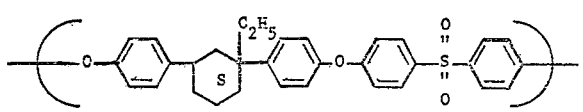

8. The matrix defined in claim 1 wherein said polyarylene polyether is composed of recurring units having the formula

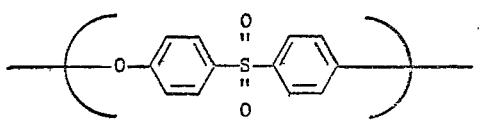

9. A reformable, thermoplastic matrix against which polymeric material can be molded to produce printing plates and the like formed from a sheet comprising at least one fibrous layer bound between layers of thermoplastic polyarylene polyether, the thickness of the thermoplastic polyarylene polyether at the surfaces of the composite sheet is thicker than the deepest impression made into it during the formation of a matrix, said matrix exhibiting uniform mold shrinkage in all directions of 0.5% and less, and characterized by being thermally and dimensionally stable at molding temperatures of up to 350° F.

10. The matrix defined in claim 9 wherein said polyarylene polyether is composed of recurring units having the formula

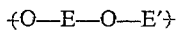

wherein E is the residuum of a dihydric phenol and E' is the residuum of a benzenoid compound having an inert electron withdrawing group in at least one of the positions ortho and para to the valence bonds, and where both of said residua are valently bonded to the ether oxygens through aromatic carbon atoms.

11. The matrix defined in claim 9 wherein said polyarylene polyether is composed of recurring units having the formula

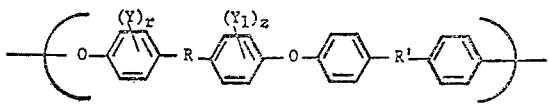

wherein R represents a member of the group consisting of a bond between aromatic carbon atoms and a divalent connecting radical and R' represents a member of the group consisting of sulfone, carbonyl, vinyl, sulfoxide, azo, saturated fluorocarbon, organic phosphine oxide and ethylidene groups and Y and $Y_1$ each represent inert substituent groups selected from the group consisting of halogen, alkyl groups having from 1 to 4 carbon atoms and alkoxy groups having from 1 to 4 carbon atoms and where $r$ and $z$ are integers having a value from 0 to 4 inclusive.

12. The matrix defined in claim 9 wherein said fibrous layer is composed of glass fibers.

13. The matrix defined in claim 9 wherein polyarylene polyether is composed of recurring units having the formula

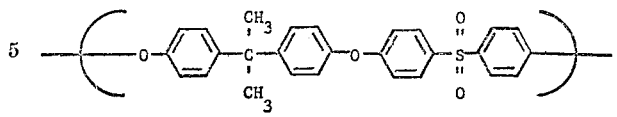

14. The matrix defined in claim 9 wherein said polyarylene polyether is composed of recurring units having the formula

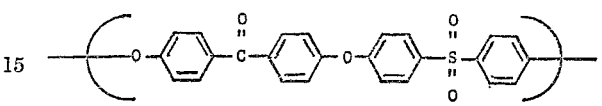

15. The matrix defined in claim 9 wherein said polyarylene polyether is composed of recurring units having the formula

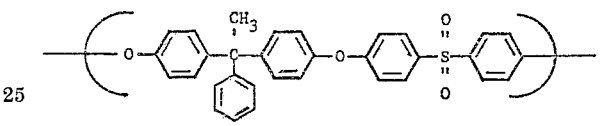

16. The matrix defined in claim 9 wherein said polyarylene polyether is composed of recurring units having the formula

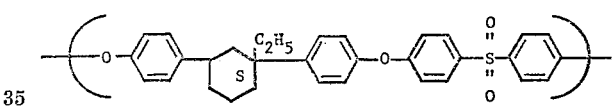

17. The matrix defined in claim 9 wherein said polyarylene polyether is composed of recurring units having the formula

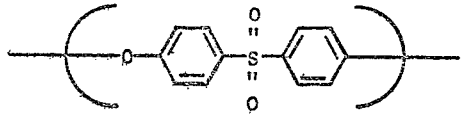

18. A process for forming at least two matrices from a single sheet of thermoplastic polyarylene polyether which comprises contacting said sheet with a first pattern, applying heat and pressure to said sheet thereby forming a first matrix, thereafter contacting the back of said first matrix with a second pattern, applying simultaneous heat and pressure to said first matrix thereby forming a second matrix and molding at least one polymeric duplicate member against said second matrix at molding temperatures of up to 350° F.

References Cited
UNITED STATES PATENTS

| 2,509,499 | 5/1950 | Higgins | 161—260 X |
| 2,849,752 | 9/1958 | Leary | 264—230 X |
| 3,181,206 | 5/1965 | Hagney et al. | 101—401.2 X |
| 3,238,086 | 3/1966 | Tomkins | 161—400 |
| 3,238,087 | 3/1966 | Norwalk et al. | 161—185 |

EARL M. BERGERT, *Primary Examiner.*

HAROLD ANSHER, *Examiner.*